(12) United States Patent
Narendra et al.

(10) Patent No.: US 11,954,882 B2
(45) Date of Patent: Apr. 9, 2024

(54) FEATURE-BASED GEOREGISTRATION FOR MOBILE COMPUTING DEVICES

(71) Applicant: Zebra Technologies Corporation, Lincolnshire, IL (US)

(72) Inventors: Patrenahalli M. Narendra, Hoffman Estates, IL (US); Joseph R. White, Glenwood, MD (US); Andrea Mirabile, London (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 250 days.

(21) Appl. No.: 17/350,929

(22) Filed: Jun. 17, 2021

(65) Prior Publication Data

US 2022/0405958 A1 Dec. 22, 2022

(51) Int. Cl.
 *G06T 7/73* (2017.01)
 *G06F 18/22* (2023.01)
 *G06T 7/00* (2017.01)
 *G06V 20/30* (2022.01)

(52) U.S. Cl.
 CPC ............... *G06T 7/73* (2017.01); *G06F 18/22* (2023.01); *G06T 7/001* (2013.01); *G06V 20/30* (2022.01); *G06T 2207/30128* (2013.01); *G06T 2207/30244* (2013.01)

(58) Field of Classification Search
 None
 See application file for complete search history.

(56) References Cited

U.S. PATENT DOCUMENTS

| 5,209,712 A | 5/1993 | Ferri |
| 5,214,615 A | 5/1993 | Bauer |
| 5,408,322 A | 4/1995 | Hsu et al. |
| 5,414,268 A | 5/1995 | McGee |

(Continued)

FOREIGN PATENT DOCUMENTS

| CA | 2835830 | 11/2012 |
| CA | 3028156 | 1/2018 |

(Continued)

OTHER PUBLICATIONS

Boden, "French retail chain to roll out NFC shelf edge labels to six hypermarkets" (Sep. 19, 2018), pp. 1-7.

(Continued)

*Primary Examiner* — David Perlman

(57) ABSTRACT

A method in a computing device includes: in a facility containing a plurality of support structures, capturing an image of a first support structure; detecting, in the image, a first feature set of the first support structure; selecting obtaining at least one reference feature set by proximity to an estimated location of the mobile computing device in the facility coordinate system, the at least one reference feature set selected from a repository defining feature locations for each of the support structures in a facility coordinate system; comparing the first feature set with the at least one reference feature set; and in response to determining that the first feature set matches the at least one reference feature set, determining a location of the mobile computing device in the facility coordinate system based on the image and the feature locations from the repository.

22 Claims, 6 Drawing Sheets

(56) References Cited

U.S. PATENT DOCUMENTS

| | | |
|---|---|---|
| 5,423,617 A | 6/1995 | Marsh et al. |
| 5,534,762 A | 7/1996 | Kim |
| 5,566,280 A | 10/1996 | Fukui et al. |
| 5,704,049 A | 12/1997 | Briechle |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,723 B1 | 4/2004 | Gibson et al. |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,260,742 B2 | 9/2012 | Cognigni et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,571,314 B2 | 10/2013 | Tao et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,072,929 B1 | 7/2015 | Rush et al. |
| 9,120,622 B1 | 9/2015 | Elazary et al. |
| 9,129,277 B2 | 9/2015 | Macintosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 | 12/2016 | Kentley et al. |
| 9,542,746 B2 | 1/2017 | Wu et al. |
| 9,547,838 B2 | 1/2017 | Larsen |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,589,353 B2 | 3/2017 | Mueller-Fischer et al. |
| 9,600,731 B2 | 3/2017 | Yasunaga et al. |
| 9,600,892 B2 | 3/2017 | Patel et al. |
| 9,612,123 B1 | 4/2017 | Levinson et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,779,205 B2 | 10/2017 | Namir |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,953,420 B2 | 4/2018 | Wolski et al. |
| 9,980,009 B2 | 5/2018 | Jiang et al. |
| 9,994,339 B2 | 6/2018 | Colson et al. |
| 9,996,818 B1 | 6/2018 | Ren et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,133,951 B1 | 11/2018 | Mendonca et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,262,294 B1 | 4/2019 | Hahn et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | DeLuca |
| 10,352,689 B2 | 7/2019 | Brown et al. |
| 10,373,116 B2 | 8/2019 | Medina et al. |
| 10,394,244 B2 | 8/2019 | Song et al. |
| 10,429,487 B1 | 10/2019 | Fowe |
| 11,003,188 B2 | 5/2021 | Scott et al. |
| 2001/0031069 A1 | 10/2001 | Kondo et al. |
| 2001/0041948 A1 | 11/2001 | Ross et al. |
| 2002/0006231 A1 | 1/2002 | Jayant et al. |
| 2002/0059202 A1 | 5/2002 | Hadzikadic et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0084527 A1 | 5/2004 | Bong et al. |
| 2004/0131278 A1 | 7/2004 | Imagawa et al. |
| 2004/0240754 A1 | 12/2004 | Smith et al. |

(56) References Cited

U.S. PATENT DOCUMENTS

| | | |
|---|---|---|
| 2005/0016004 A1 | 1/2005 | Armstrong et al. |
| 2005/0114059 A1 | 5/2005 | Chang et al. |
| 2005/0128195 A1 | 6/2005 | Houston et al. |
| 2005/0174351 A1 | 8/2005 | Chang |
| 2005/0213082 A1 | 9/2005 | DiBernardo et al. |
| 2005/0213109 A1 | 9/2005 | Schell et al. |
| 2005/0237320 A1 | 10/2005 | Itoh et al. |
| 2006/0032915 A1 | 2/2006 | Schwartz |
| 2006/0045325 A1 | 3/2006 | Zavadsky et al. |
| 2006/0064286 A1 | 3/2006 | Fink et al. |
| 2006/0078224 A1 | 4/2006 | Hirosawa |
| 2006/0106742 A1 | 5/2006 | Bochicchio et al. |
| 2006/0279527 A1 | 12/2006 | Zehner et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0183730 A1 | 7/2008 | Enga |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0009713 A1* | 1/2010 | Freer .................. G06V 10/95 455/556.1 |
| 2010/0017407 A1 | 1/2010 | Beniyama et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0161569 A1 | 6/2010 | Schreter |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0235033 A1 | 9/2010 | Yamamoto et al. |
| 2010/0241289 A1 | 9/2010 | Sandberg |
| 2010/0257149 A1 | 10/2010 | Cognigni et al. |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0178708 A1* | 7/2011 | Zhang .................. G01C 25/005 701/501 |
| 2011/0188759 A1 | 8/2011 | Filimonova et al. |
| 2011/0216063 A1 | 9/2011 | Hayes |
| 2011/0242286 A1 | 10/2011 | Pace et al. |
| 2011/0246503 A1 | 10/2011 | Bender et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0017028 A1 | 1/2012 | Tsirkin |
| 2012/0019393 A1 | 1/2012 | Wolinsky et al. |
| 2012/0022913 A1 | 1/2012 | Volkmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0278782 A1 | 11/2012 | Pal et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0076586 A1 | 3/2013 | Karhuketo et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0138534 A1 | 5/2013 | Herwig |
| 2013/0142421 A1 | 6/2013 | Silver et al. |
| 2013/0144565 A1 | 6/2013 | Miller et al. |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0169681 A1 | 7/2013 | Rasane et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0232039 A1 | 9/2013 | Jackson et al. |
| 2013/0235165 A1 | 9/2013 | Gharib et al. |
| 2013/0235206 A1 | 9/2013 | Smith et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2013/0342363 A1 | 12/2013 | Paek et al. |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0006229 A1 | 1/2014 | Birch et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0088761 A1 | 3/2014 | Shamlian et al. |
| 2014/0098094 A1 | 4/2014 | Neumann et al. |
| 2014/0100813 A1 | 4/2014 | Shaowering |

(56) References Cited

U.S. PATENT DOCUMENTS

| | | |
|---|---|---|
| 2014/0104413 A1 | 4/2014 | McCloskey et al. |
| 2014/0112537 A1 | 4/2014 | Frank et al. |
| 2014/0129027 A1 | 5/2014 | Schnittman |
| 2014/0133740 A1 | 5/2014 | Plagemann et al. |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195095 A1 | 7/2014 | Flohr et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0279294 A1 | 9/2014 | Field-Darragh et al. |
| 2014/0300637 A1 | 10/2014 | Fan et al. |
| 2014/0316875 A1 | 10/2014 | Tkachenko et al. |
| 2014/0330835 A1 | 11/2014 | Boyer |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0016712 A1 | 1/2015 | Rhoads et al. |
| 2015/0019391 A1 | 1/2015 | Kumar et al. |
| 2015/0029339 A1 | 1/2015 | Kobres et al. |
| 2015/0032304 A1 | 1/2015 | Nakamura et al. |
| 2015/0039458 A1 | 2/2015 | Reid |
| 2015/0049955 A1* | 2/2015 | Stoeffler ............... G06F 18/22 382/220 |
| 2015/0052029 A1 | 2/2015 | Wu et al. |
| 2015/0088618 A1 | 3/2015 | Basir et al. |
| 2015/0088701 A1 | 3/2015 | Desmarais et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0195491 A1 | 7/2015 | Shaburov et al. |
| 2015/0212521 A1 | 7/2015 | Pack et al. |
| 2015/0235157 A1 | 8/2015 | Avegliano et al. |
| 2015/0243073 A1 | 8/2015 | Chen et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310348 A1 | 10/2015 | Dessouky et al. |
| 2015/0310601 A1 | 10/2015 | Rodriguez et al. |
| 2015/0332368 A1 | 11/2015 | Vartiainen et al. |
| 2015/0352721 A1 | 12/2015 | Wicks et al. |
| 2015/0353280 A1 | 12/2015 | Brazeau et al. |
| 2015/0355639 A1 | 12/2015 | Versteeg et al. |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0042223 A1 | 2/2016 | Suh et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0259329 A1 | 9/2016 | High et al. |
| 2016/0260051 A1 | 9/2016 | Wu et al. |
| 2016/0260054 A1 | 9/2016 | High et al. |
| 2016/0271795 A1 | 9/2016 | Vicenti |
| 2016/0290805 A1 | 10/2016 | Irish et al. |
| 2016/0313133 A1 | 10/2016 | Zeng et al. |
| 2016/0328618 A1 | 11/2016 | Patel et al. |
| 2016/0328767 A1 | 11/2016 | Bonner et al. |
| 2016/0353099 A1 | 12/2016 | Thomson et al. |
| 2016/0364634 A1 | 12/2016 | Davis et al. |
| 2016/0375592 A1 | 12/2016 | Szatmary et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0030538 A1 | 2/2017 | Geisler et al. |
| 2017/0032311 A1 | 2/2017 | Rizzolo et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0083774 A1 | 3/2017 | Solar et al. |
| 2017/0084037 A1 | 3/2017 | Barajas Hernandez et al. |
| 2017/0109940 A1 | 4/2017 | Guo et al. |
| 2017/0147966 A1 | 5/2017 | Aversa et al. |
| 2017/0150129 A1 | 5/2017 | Pangrazio |
| 2017/0178060 A1 | 6/2017 | Schwartz |
| 2017/0178227 A1* | 6/2017 | Graham ............ G06Q 30/0643 |
| 2017/0178301 A1 | 6/2017 | Moraleda et al. |
| 2017/0178310 A1 | 6/2017 | Gornish |
| 2017/0193434 A1 | 7/2017 | Shah et al. |
| 2017/0205892 A1 | 7/2017 | Petrovskaya et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1* | 10/2017 | Skaff ...................... G01S 17/88 |
| 2017/0286901 A1 | 10/2017 | Skaff et al. |
| 2017/0297478 A1 | 10/2017 | Sherman et al. |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2017/0344016 A1 | 11/2017 | Chen et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0075403 A1 | 3/2018 | Mascorro Medina et al. |
| 2018/0089613 A1 | 3/2018 | Chen et al. |
| 2018/0101813 A1 | 4/2018 | Paat et al. |
| 2018/0107999 A1 | 4/2018 | Rizzolo et al. |
| 2018/0108120 A1 | 4/2018 | Venable et al. |
| 2018/0108134 A1 | 4/2018 | Venable et al. |
| 2018/0114183 A1 | 4/2018 | Howell |
| 2018/0129201 A1 | 5/2018 | Douglas et al. |
| 2018/0130011 A1 | 5/2018 | Jacobsson |
| 2018/0136648 A1 | 5/2018 | Su et al. |
| 2018/0143003 A1 | 5/2018 | Clayton et al. |
| 2018/0174325 A1 | 6/2018 | Fu et al. |
| 2018/0190160 A1 | 7/2018 | Bryan et al. |
| 2018/0197139 A1 | 7/2018 | Hill |
| 2018/0201423 A1 | 7/2018 | Drzewiecki et al. |
| 2018/0204111 A1 | 7/2018 | Zadeh et al. |
| 2018/0218218 A1 | 8/2018 | Madan et al. |

(56) References Cited

U.S. PATENT DOCUMENTS

| | | |
|---|---|---|
| 2018/0251253 A1 | 9/2018 | Taira et al. |
| 2018/0276596 A1 | 9/2018 | Murthy et al. |
| 2018/0281191 A1 | 10/2018 | Sinyavskiy et al. |
| 2018/0293442 A1 | 10/2018 | Fridental et al. |
| 2018/0293543 A1 | 10/2018 | Tiwari |
| 2018/0306958 A1 | 10/2018 | Goss et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2018/0321692 A1 | 11/2018 | Castillo-Effen et al. |
| 2018/0370727 A1 | 12/2018 | Hance et al. |
| 2019/0025838 A1 | 1/2019 | Artes et al. |
| 2019/0034854 A1 | 1/2019 | Borodow et al. |
| 2019/0049962 A1 | 2/2019 | Ouellette et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0073627 A1 | 3/2019 | Nakdimon et al. |
| 2019/0077015 A1 | 3/2019 | Shibasaki et al. |
| 2019/0087663 A1 | 3/2019 | Yamazaki et al. |
| 2019/0094876 A1 | 3/2019 | Moore et al. |
| 2019/0108606 A1 | 4/2019 | Komiyama |
| 2019/0108678 A1 | 4/2019 | Hazeghi et al. |
| 2019/0156513 A1* | 5/2019 | McNeally ............ G01C 21/16 |
| 2019/0160675 A1 | 5/2019 | Paschall, II et al. |
| 2019/0178436 A1 | 6/2019 | Mao et al. |
| 2019/0180150 A1 | 6/2019 | Taylor et al. |
| 2019/0197439 A1 | 6/2019 | Wang |
| 2019/0197728 A1 | 6/2019 | Yamao |
| 2019/0236530 A1 | 8/2019 | Cantrell et al. |
| 2019/0271984 A1 | 9/2019 | Kingsford |
| 2019/0304132 A1 | 10/2019 | Yoda et al. |
| 2019/0359300 A1 | 11/2019 | Johnson et al. |
| 2019/0392212 A1 | 12/2019 | Sawhney et al. |
| 2019/0392506 A1 | 12/2019 | Bogolea et al. |
| 2020/0049511 A1 | 2/2020 | Sithiravel et al. |
| 2020/0053325 A1 | 2/2020 | Deyle et al. |
| 2020/0064483 A1 | 2/2020 | Li et al. |
| 2020/0068126 A1 | 2/2020 | Fink et al. |
| 2020/0111267 A1 | 4/2020 | Stauber et al. |
| 2020/0118064 A1 | 4/2020 | Perrella et al. |
| 2020/0150655 A1 | 5/2020 | Artes et al. |
| 2020/0192388 A1 | 6/2020 | Zhang et al. |
| 2020/0314333 A1 | 10/2020 | Liang et al. |
| 2020/0341151 A1 | 10/2020 | Yoshida |
| 2020/0410766 A1 | 12/2020 | Swaminathan |
| 2021/0019939 A1 | 1/2021 | Hu et al. |
| 2021/0146552 A1 | 5/2021 | Hong et al. |
| 2021/0163068 A1 | 6/2021 | Zhu et al. |
| 2021/0233305 A1 | 7/2021 | Garcia et al. |
| 2021/0271238 A1 | 9/2021 | Ko et al. |

FOREIGN PATENT DOCUMENTS

| | | |
|---|---|---|
| CN | 101809601 | 8/2008 |
| CN | 102214343 | 10/2011 |
| CN | 104200086 | 12/2014 |
| CN | 105701519 | 12/2015 |
| CN | 105989512 | 10/2016 |
| CN | 107067382 | 8/2017 |
| CN | 206952978 | 2/2018 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| EP | 3400113 | 11/2018 |
| FR | 3001567 | 8/2014 |
| GB | 2323238 | 9/1998 |
| GB | 2330265 | 4/1999 |
| JP | 2014170431 | 9/2014 |
| JP | 2016194834 | 11/2016 |
| JP | 2017016539 | 1/2017 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014063157 | 4/2014 |
| WO | WO 2014066422 | 5/2014 |
| WO | WO 2014092552 | 6/2014 |
| WO | WO 2014181323 | 11/2014 |
| WO | WO 2015127246 | 8/2015 |
| WO | WO 2015127503 | 9/2015 |
| WO | WO 2016020038 | 2/2016 |
| WO | WO 2017175312 | 10/2017 |
| WO | WO 2017187106 | 11/2017 |
| WO | WO 2017201483 | 11/2017 |
| WO | WO 2018018007 | 1/2018 |
| WO | WO 2018026631 | 2/2018 |
| WO | WO 2018204308 | 11/2018 |
| WO | WO 2018204342 | 11/2018 |
| WO | WO 2019023249 | 1/2019 |

OTHER PUBLICATIONS

Biswas et al. "Depth Camera Based Indoor Mobile Robot Localization and Navigation" Robotics and Automation (ICRA), 2012 IEEE International Conference on IEEE, 2012.

Bohm, Multi-Image Fusion for Occlusion-Free Façade Texturing, International Archives of the Photogrammetry, Remote Sensing and Spatial Information Sciences, pp. 867-872 (Jan. 2004).

Bristow et al., "A Survey of Iterative Learning Control", IEEE Control Systems, Jun. 2006, pp. 96-114.

Buenaposada et al. "Realtime tracking and estimation of plane pose" Proceedings of the ICPR (Aug. 2002) vol. II, IEEE pp. 697-700.

Carreira et al., "Enhanced PCA-based localization using depth maps with missing data," IEEE, pp. 1-8, Apr. 24, 2013.

Castorena et al., "Autocalibration of lidar and optical cameras via edge alignment", 2016 IEEE International Conference on Acoustics, Speech and Signal Processing (Mar. 20, 2016).

Chen et al. "Improving Octree-Based Occupancy Maps Using Environment Sparsity with Application to Aerial Robot Navigation" Robotics and Automation (ICRA), 2017 IEEE International Conference on IEEE, pp. 3656-3663, 2017.

Clark, "Casino to open world's first NFC-enabled supermarket", (Sep. 19, 2018), pp. 1-7.

Clark, "Jogtek launches passive NFC shelf-edge labels", (Sep. 19, 2018), pp. 1-6.

Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).

Cook et al., "Distributed Ray Tracing" ACM SIGGRAPH Computer Graphics, vol. 18, No. 3, ACM pp. 137-145, 1984.

Datta, A., et al. "Accurate camera calibration using iterative refinement of control points," in Computer Vision Workshops (ICCV Workshops), 2009.

Deschaud, et al., "A Fast and Accurate Place Detection algoritm for large noisy point clouds using filtered normals and voxel growing," 3DPVT, May 2010, Paris, France. [hal-01097361].

Douillard, Bertrand, et al. "On the segmentation of 3D LIDAR point clouds." Robotics and Automation (ICRA), 2011 IEEE International Conference on IEEE, 2011.

(56) References Cited

OTHER PUBLICATIONS

Dubois, M., et al., A comparison of geometric and energy-based point cloud semantic segmentation methods, European Conference on Mobile Robots (ECMR), p. 88-93, 25-27, Sep. 2013.

Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).

F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.

Federico Tombari et al. "Multimodal cue integration through Hypotheses Verification for RGB-D object recognition and 6DOF pose estimation", IEEE International Conference on Robotics and Automation, Jan. 2013.

Flores, et al., "Removing Pedestrians from Google Street View Images", Computer Vision and Pattern Recognition Workshops, 2010 IEEE Computer Society Conference On, IEE, Piscataway, NJ, pp. 53-58 (Jun. 13, 2010).

Glassner, "Space Subdivision for Fast Ray Tracing." IEEE Computer Graphics and Applications, 4.10, pp. 15-24, 1984.

Golovinskiy, Aleksey, et al. "Min-Cut based segmentation of point clouds." Computer Vision Workshops (ICCV Workshops), 2009 IEEE 12th International Conference on. IEEE, 2009.

Gruen et al., "Automatic Reconstruction and Visualization of a Complex Buddha Tower of Bayon, Cambodia" (Sep. 2001) [http:www.idb.arch.ethz.ch/files/konstanz_bayonpaper.pdf].

Hackel et al., "Contour Detection in unstructured 3D point clouds,"IEEE, 2016 Conference on Computer vision and Pattern recognition (CVPR), Jun. 27-30, 2016, pp. 1-9.

Hao et al., "Structure-based object detection from scene point clouds," Science Direct, v191, pp. 148-160 (2016).

Hu et al., "An improved method of discrete point cloud filtering based on complex environment," International Journal of Applied Mathematics and Statistics, v48, i18 (2013).

International Search Report and Written Opinion for International Patent Application No. PCT/US2013/070996 dated Apr. 2, 2014.

International Search Report and Written Opinion for International Patent Application No. PCT/US2013/053212 dated Dec. 1, 2014.

International Search Report and Written Opinion for corresponding International Patent Application No. PCT/US2016/064110 dated Mar. 20, 2017.

International Search Report and Written Opinion for corresponding International Patent Application No. PCT/US2017/024847 dated Jul. 7, 2017.

International Search Report and Written Opinion for International Application No. PCT/CN2017/083143 dated Feb. 11, 2018.

International Search Report and Written Opinion for International Application No. PCT/US2018/030419 dated Aug. 31, 2018.

International Search Report and Written Opinion from International Patent Application No. PCT/US2018/030345 dated Sep. 17, 2018.

International Search Report and Written Opinion from International Patent Application No. PCT/US2018/030360 dated Jul. 9, 2018.

International Search Report and Written Opinion from International Patent Application No. PCT/US2018/030363 dated Jul. 9, 2018.

International Search Report and Written Opinion for International Application No. PCT/US2019/025859 dated Jul. 3, 2019.

International Search Report and Written Opinion from International Patent Application No. PCT/US2019/025849 dated Jul. 9, 2019.

International Search Report and Written Opinion from International Patent Application No. PCT/US2019/049761 dated Nov. 15, 2019.

International Search Report and Written Opinion from International Patent Application No. PCT/US2019/051312 dated Nov. 15, 2019.

International Search Report and Written Opinion from International Patent Application No. PCT/US2019/054103 dated Jan. 6, 2020.

International Search Report and Written Opinion for International Patent Application No. PCT/US2019/057007 dated Jan. 14, 2020.

International Search Report and Written Opinion from International Patent Application No. PCT/US2019/064020 dated Feb. 19, 2020.

International Search Report and Written Opinion for International Patent Application No. PCT/US2020/027948 dated Jul. 16, 2020.

International Search Report and Written Opinion for International Patent Application No. PCT/US2020/028133 dated Jul. 24, 2020.

International Search Report and Written Opinion from International Patent Application No. PCT/US2020/029134 dated Jul. 27, 2020.

International Search Report and Written Opinion from International Patent Application No. PCT/US2020/028183 dated Jul. 24, 2020.

International Search Report and Written Opinion from International Patent Application No. PCT/US2020/035285 dated Aug. 27, 2020.

International Search Report and Written Opinion for International Patent Application No. PCT/US2021/024805 dated Aug. 2, 2021.

International Search Report and Written Opinion for International Patent Application No. PCT/US2021/057388 dated Feb. 2, 2022.

International Search Report and Written Opinion for International Patent Application No. PCT/IB2021/060948 dated Feb. 4, 2022.

International Search Report and Written Opinion for International Patent Application No. PCT/US2022/037723 dated Jul. 20, 2022.

Jadhav et al. "Survey on Spatial Domain dynamic template matching technique for scanning linear barcode," International Journal of science and research v 5 n 3, Mar. 2016)(Year: 2016).

Jian Fan et al: "Shelf detection via vanishing point and radial projection", 2014 IEEE International Conference on image processing (ICIP), IEEE, (Oct. 27, 2014), pp. 1575-1578.

Kaikai Liu et al., "Enabling Context-Aware Indoor Augmented Reality via Smartphone Sensing and Vision Tracking", ACM Transactions on Multimedia Computing Communications and Applications, Association for Computer Machinery, US, vol. 12, No.

Kang et al., "Kinematic Path-Tracking of Mobile Robot Using Iterative learning Control", Journal of Robotic Systems, 2005, pp. 111-121.

Kay et al. "Ray Tracing Complex Scenes." ACM SIGGRAPH Computer Graphics, vol. 20, No. 4, ACM, pp. 269-278, 1986.

Kelly et al., "Reactive Nonholonomic Trajectory Generation via Parametric Optimal Control", International Journal of Robotics Research, vol. 22, No. 7-8, pp. 583-601 (Jul. 30, 2013).

Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.

Lecking et al: "Localization in a wide range of industrial environments using relative 3D ceiling features", IEEE, pp. 333-337 (Sep. 15, 2008).

Lee et al. "Statistically Optimized Sampling for Distributed Ray Tracing." ACM SIGGRAPH Computer Graphics, vol. 19, No. 3, ACM, pp. 61-67, 1985.

Li et al., "An improved RANSAC for 3D Point cloud plane segmentation based on normal distribution transformation cells," Remote sensing, V9: 433, pp. 1-16 (2017).

Likhachev, Maxim, and Dave Ferguson. "Planning Long dynamically feasible maneuvers for autonomous vehicles." The international journal of Robotics Reasearch 28.8 (2009): 933-945. (Year:2009).

Marder-Eppstein et al., "The Office Marathon: robust navigation in an indoor office environment," IEEE, 2010 International conference on robotics and automation, May 3-7, 2010, pp. 300-307.

McNaughton, Matthew, et al. "Motion planning for autonomous driving with a conformal spatiotemporal lattice." Robotics and Automation (ICRA), 2011 IEEE International Conference on. IEEE, 2011. (Year: 2011).

Meyersohn, "Walmart turns to robots and apps in stores", https://www.cnn.com/2018/12/07/business/walmart-robot-janitors-dotcom- store/index.html, Oct. 29, 2019.

Mitra et al., "Estimating surface normals in noisy point cloud data," International Journal of Computational geometry & applications, Jun. 8-10, 2003, pp. 322-328.

N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.

Ni et al., "Edge Detection and Feature Line Tracing in 3D-Point Clouds by Analyzing Geometric Properties of Neighborhoods," Remote Sensing, V8 I9, pp. 1-20 (2016).

(56) References Cited

OTHER PUBLICATIONS

Norriof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.
Notice of allowance for U.S. Appl. No. 15/211,103 dated Apr. 5, 2017.
Olson, Clark F., etal. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, p. 176-.
Park et al., "Autonomous mobile robot navigation using passive rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Puwein, J., et al."Robust Multi-view camera calibration for widebaseline camera networks," in IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutroials/pairwise_incremental_registration.php.
Rusu, et al. "Spatial Change detection on unorganized point cloud data," PCL Library, retrieved from internet on Aug. 19, 2016 [http://pointclouds.org/documentation/tutorials/octree_change.php].
Rusu, et al. "Towards 3D Point cloud based object maps for household environments," Science Direct, vol. 56, issue 11, pp. 927-947 [http://www.sciencedirect.com/science/article/pii/S0921889008001140]. Nov. 30, 2008. Retrieved from the internet on Jun. 15, 2022.
Schnabel et al. "Efficient RANSAC for Point-Cloud Shape Detection", vol. 0, No. 0, pp. 1-12 (1981).
Senthilkumaran, et al., "Edge Detection Techniques for Image Segmentation—A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzaliskiBook_20100903_draft.pdf].
Tahir, Rabbani, et al., "Segmentation of point clouds using smoothness constraint," International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=p.

Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference On, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.
United Kingdom Intellectual Property Office, Combined Search and Examination Report dated May 13, 2020 for GB Patent Application No. 1917864.9.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
Fan Zhang et al., "Parallax-tolerant Image Stitching", 2014 Computer Vision Foundation, pp. 4321-4328.
Kaimo Lin et al., "SEAGULL: Seam-guided Local Alignment for Parallax-tolerant Image Stitching", Retrieved on Nov. 16, 2020 [http://publish.illinois.edu/visual-modeling-and-analytics/files/2016/08/Seagull.pdf].
Julio Zaragoza et al., "As-Projective-As-Possible Image Stitching with Moving DLT", 2013 Computer Vision Foundation, pp. 2339-2346.
Zeng et al., Multi-view Self Supervised Deep Learning for 6D Pose Estimation in the Amazon Picking Challenge, May 7, 2017. Retrieved on Nov. 16, 2019 [https://arxiv.org/pdf/1609.09475.pdf].
Zhang et al., "Mobile computing and industrial augmented reality for real-time data access", Emerging Technologies and Factory Automation, 2001, 8th IEEE International Conference on Oct. 15-18, 2001, pp. 583-588, vol. 2.
Alshawabkeh et al., "Automatic Multi-Image Photo-Texturing of Complex 3D Scenes", CIPA 2005 XX International Symposium, (Sep. 26, 2005).
"Fair Billing with Automatic Dimensioning" pp. 1-4, undated, Copyright Mettler-Toledo International Inc.
"Plane Detection in Point Cloud Data" dated Jan. 25, 2010 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.

* cited by examiner

FEATURE-BASED GEOREGISTRATION FOR MOBILE COMPUTING DEVICES

BACKGROUND

Handling of items in environments such as retail facilities, warehouses, and the like, may be performed by staff operating transport vehicles (e.g. forklifts), on foot, or the like. Such facilities may be large and complex, and may contain a wide variety of items. In order to navigate a facility, a staff member may rely on a mobile computing device. However, given that these facilities are often indoors, locationing technologies such as the global positioning system (GPS) may not be reliably available. Indoor locationing technologies may be insufficiently accurate for some tasks expected of the staff.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
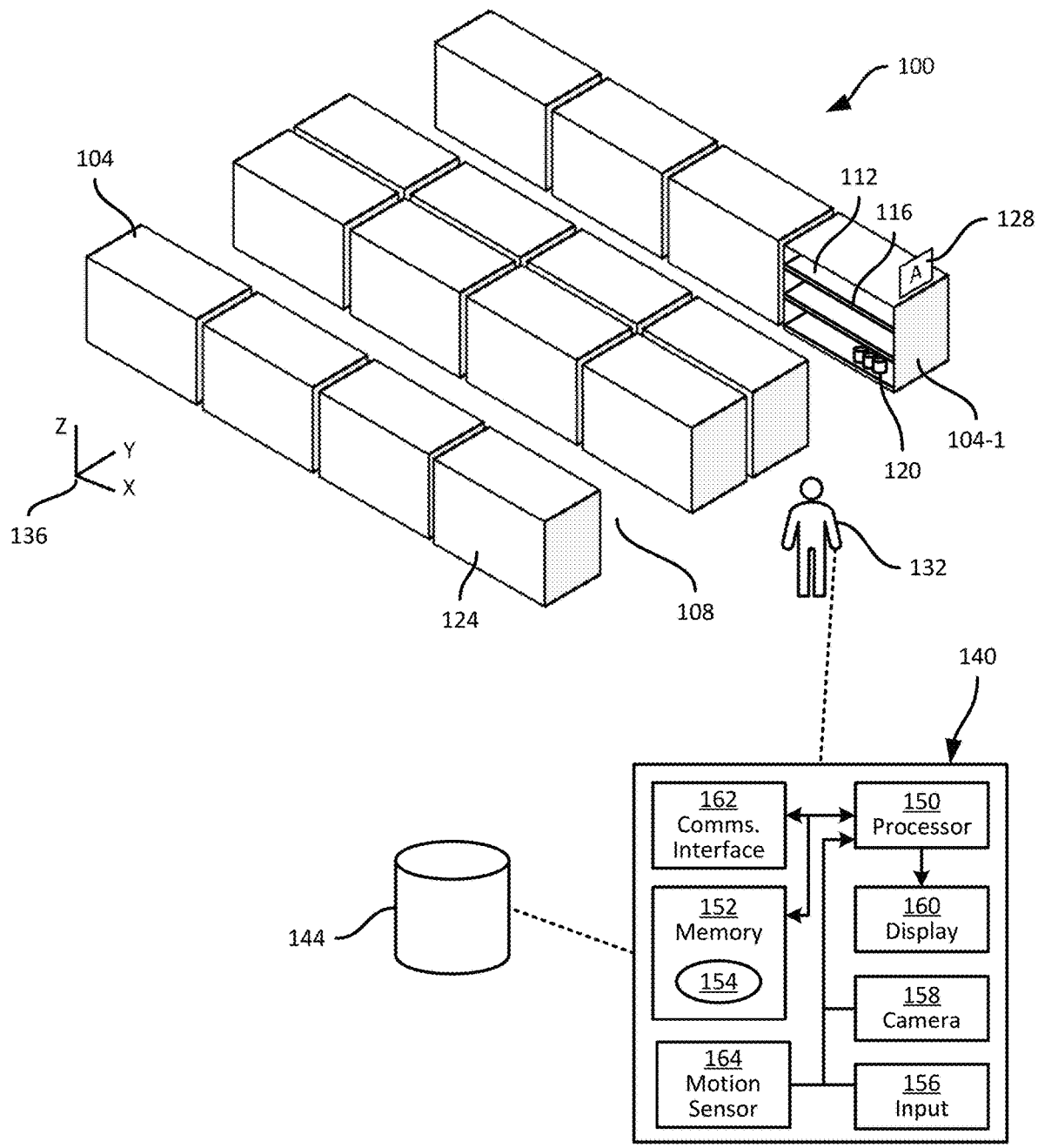
FIG. 1 is a diagram of a facility containing a mobile computing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a computing device, the method comprising: in a facility containing a plurality of support structures, capturing an image of a first support structure; detecting, in the image, a first feature set of the first support structure; selecting at least one reference feature set by proximity to an estimated location of the mobile computing device in the facility coordinate system, the at least one reference feature set selected from a repository defining feature locations for each of the support structures in a facility coordinate system; comparing the first feature set with the at least one reference feature set; and in response to determining that the first feature set matches the at least one reference feature set, determining a location of the mobile computing device in the facility coordinate system based on the image and the feature locations from the repository.

Additional examples disclosed herein are directed to a computing device, comprising: a memory; and a processor configured to: in a facility containing a plurality of support structures, capture an image of a first support structure; detect, in the image, a first feature set of the first support structure; select at least one reference feature set by proximity to an estimated location of the mobile computing device in the facility coordinate system, the at least one reference feature set selected from a repository defining feature locations for each of the support structures in a facility coordinate system; compare the first feature set with the at least one reference feature set; and in response to determining that the first feature set matches the at least one reference feature set, determine a location of the mobile computing device in the facility coordinate system based on the image and the feature locations from the repository.

FIG. 1 illustrates an interior of a facility, such as a retail facility (e.g. a grocer). In other examples, the facility 100 can be a warehouse, a healthcare facility, a manufacturing facility, or the like. The facility 100 includes a plurality of support structures carrying items. In the illustrated example, the support structures include shelf modules 104, e.g. arranged in sets forming aisles 108. FIG. 1, specifically, illustrates two aisles 108 each formed by eight modules 104. The facility 100 can have a wide variety of layouts other than the example layout shown in FIG. 1.

The modules 104 include support surfaces, such as shelves, pegboards, and the like, to support items thereon. Certain components of one example module 104-1 in FIG. 1 are illustrated, including support surfaces 112 (three support surfaces 112, in the illustrated example) terminating in shelf edges 116, which face into the corresponding aisle. A shelf edge 116, as will be apparent to those skilled in the art, is a surface bounded by adjacent surfaces having different angles of inclination. In the example illustrated in FIG. 1, each shelf edge 116 is at an angle of about ninety degrees relative to the corresponding support surface 112 above that shelf edge 116 and the underside (not shown) of the support surface 112. In other examples, the angles between a shelf edge 116 and adjacent surfaces is more or less than ninety degrees.

The support surfaces 112 carry items 120 thereon, for retrieval by customers, workers and the like in the facility. As seen in FIG. 1, the support surfaces 112 are accessible from the aisle 108 into which the shelf edges 116 face. In some examples, each module 104 has a back wall 124 rendering the support surfaces 112 inaccessible from the opposite side of the module 104. In other examples, however, the module 104 can be open from both sides (e.g. the back wall 124 can be omitted). The modules 104 may include additional components, such as an aisle marker 128 affixed to a module 104 that is located at the end of an aisle 108.

As will be apparent, the facility 100 may contain a wide variety of items 120 disposed on the modules 104. The facility 100 may be sufficiently large, and/or contain a sufficient number of different types of items 120, to complicate navigation of the facility 100 by a worker 132, a customer or the like, e.g. to locate one or more particular items 120 or perform other tasks. Further, location-tracking technologies such as GPS may not be reliably available because the facility 100 in indoors. Although other location technologies may be available (e.g. wireless beacons and the like), the accuracy with which such technologies can locate a computing device operated by the worker 132 may be insufficient for some processes, including the generation of augmented reality overlays on a display of the device providing directional and/or task guidance to the worker 132. For the presentation of such overlays to appear to be physically associated with the module 104 and items 120 in the field of view of the worker 132 and/or the computing device, it may be necessary for the location of the device relative to the relevant module 104 to be known to within about a centimeter, for example.

The locations of the modules 104 are predefined in a facility coordinate system 136. The layout of items 120 on each module 104 is also predefined, and the location of each item (or group of the same item, as a support surface 112 often supports a contiguous group of a given item) can therefore be determined, as discussed further below. Providing directional guidance to the worker 132, however, involves also determining the location of the worker 132 in the facility coordinate system 136 with sufficient accuracy.

The worker 132 is therefore equipped with a mobile computing device 140, also referred to simply as a device 140. The device 140 can be a tablet computer, a smart phone, a wearable computer (e.g. smart glasses), or the like. As will be discussed in detail below, the device 140 is configured to implement certain functionality to track the pose (i.e. the location and orientation) of the device 140. Pose tracking can achieve the above-mentioned centimeter-level accuracy, but is performed in a coordinate system that is local to the device 140. The local coordinate system is generally arbitrarily defined by the device 140 at runtime, and therefore lacks a predetermined relationship to the facility coordinate system 136. The functionality implemented by the device 140 therefore also enables the generation of a transform between the above-mentioned local coordinate system and the facility coordinate system 136. The transform, once established, enables the device 140 to accurately determine its pose in the facility coordinate system 136, thus enabling the device 140 to provide directional guidance to the worker 132 and/or perform other location-based tasks.

The generation of the transform relies on a repository 144 of feature locations that is accessible to the device 140. The repository 144 can be stored at the device 140, or at another computing device that is accessible to the device 140 via a network deployed in the facility 100, e.g. a server connected to the network. As will be seen in greater detail below, the device 140 is configured to detect features on the modules 104, and to locate matching features from the repository 144, thereby allowing the device 140 to establish its current location and orientation in the facility 100.

FIG. 1 also illustrates certain internal components of the device 140. The device 140 includes a special-purpose controller, such as a processor 150, interconnected with a non-transitory computer readable storage medium, such as a memory 152. The memory 152 includes a combination of volatile memory (e.g. Random Access Memory or RAM) and non-volatile memory (e.g. read only memory or ROM, Electrically Erasable Programmable Read Only Memory or EEPROM, flash memory). The processor 150 and the memory 152 each comprise one or more integrated circuits.

The device 140 also includes at least one input device 156 interconnected with the processor 150. The input device 156 is configured to receive input and provide data representative of the received input to the processor 150. The input device 156 includes any one of, or a suitable combination of, a touch screen, a keypad, a trigger button, a microphone, and the like. In addition, the device 140 includes a camera 158 including a suitable image sensor or combination of image sensors. The camera 158 is configured to capture images (e.g. single frames or video streams including sequences of image frames) for provision to the processor 150.

The device 140 also includes a display 160 (e.g. a flat-panel display integrated with the above-mentioned touch screen) interconnected with the processor 150, and configured to render data under the control of the processor 150. The client device 105 can also include one or more output devices in addition to the display 160, such as a speaker, a notification LED, and the like (not shown).

The device 140 also includes a communications interface 162 interconnected with the processor 150. The communications interface 162 includes any suitable hardware (e.g. transmitters, receivers, network interface controllers and the like) allowing the client device 105 to communicate with other computing devices via wired and/or wireless links (e.g. over local or wide-area networks). The specific components of the communications interface 162 are selected based on the type(s) of network(s) or other links that the device 140 is required to communicate over.

Further, the device 140 includes a motion sensor 164, such as an inertial measurement unit (IMU) including one or more accelerometers, one or more gyroscopes, and/or one or more magnetometers. The motion sensor 164 is configured to generate data indicating detected movement of the device 140 and provide the data to the processor 150, for example to enable the processor 150 to perform the pose tracking (in a local coordinate system) mentioned earlier.

The memory 152 stores computer readable instructions for execution by the processor 150. In particular, the memory 152 stores a localization application 154 (also referred to simply as the application 154) which, when executed by the processor 150, configures the processor 150 to perform various functions discussed below in greater detail and related to the determination of device pose in the facility coordinate system 136. The application 154 may also be implemented as a suite of distinct applications in other examples.

The processor 150, when so configured by the execution of the application 154, may also be referred to as a navigational assistance controller 150. Those skilled in the art will appreciate that the functionality implemented by the processor 150 via the execution of the application 154 may also be implemented by one or more specially designed hardware and firmware components, such as FPGAs, ASICs and the like in other embodiments.

Figure 2:
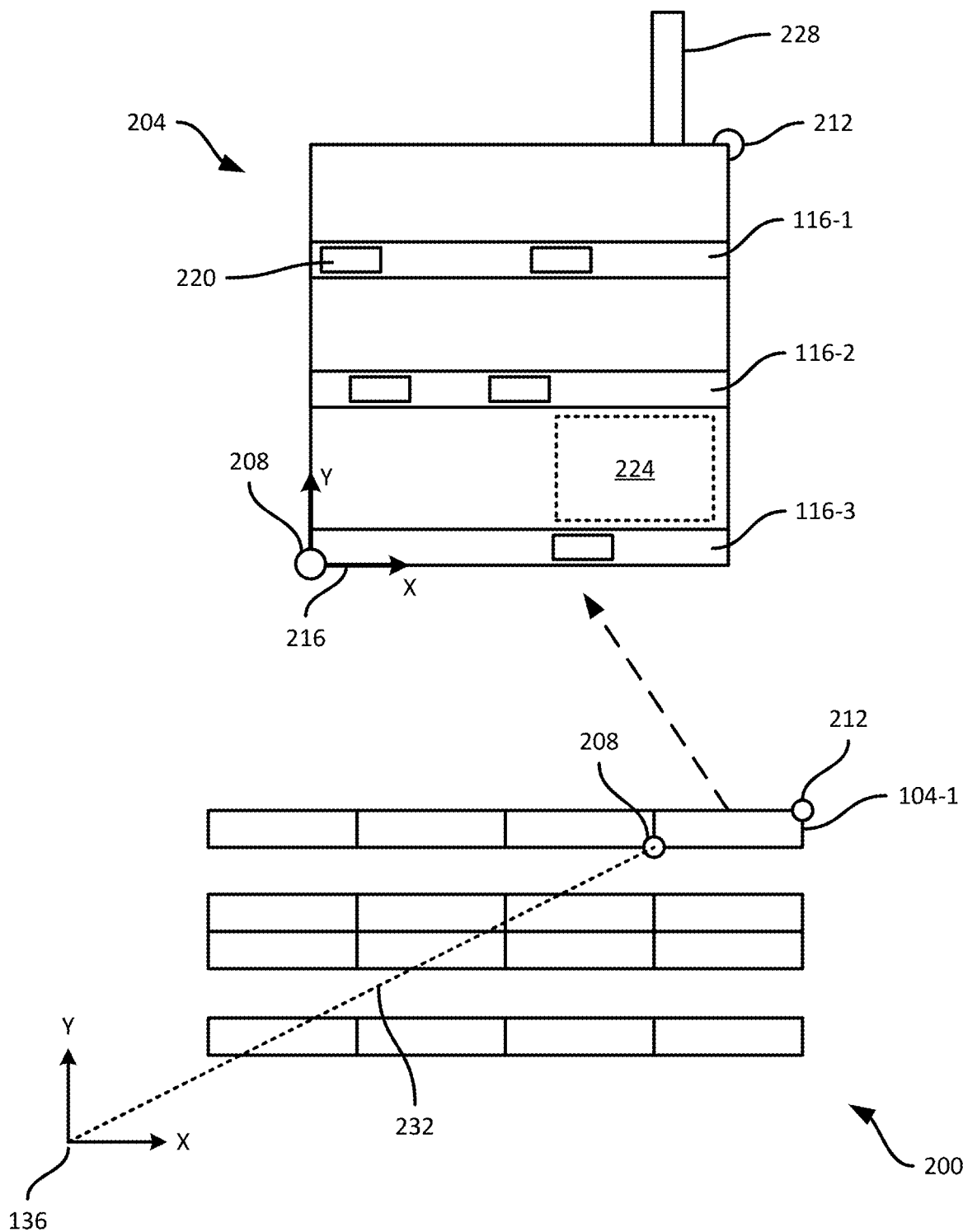
FIG. 2 is a diagram of data contained in the repository of FIG. 1.

Turning to FIG. 2, the contents of the repository 144 is discussed in greater detail. The repository 144, in general, contains locations and orientations of each of a variety of features in the facility 100. The locations and orientations of those features are defined in the facility coordinate system 136 in the repository 144. The repository can be constructed from disparate data sources, such as a facility layout 200 and a plurality of module layouts 204. The facility layout 200, for example, can specify the locations of each module 104 in the facility coordinate system 136, e.g. by coordinates of one or more corners of each module 104, and/or dimensions of the modules 104 (e.g. width, depth, and height). FIG. 2 illustrates the layout 200 in an overhead view, in which each module 104 may be defined by coordinates of a first corner 208 (e.g. the lower-left, forward corner) and a second corner (e.g. the upper-right, rearward corner).

In some examples, however, the facility layout 200 does not define the positions of features supported on or otherwise associated with each module 104. Module layouts 204 may define the positions of such features, in a coordinate system 216 specific to each module. In the illustrated example, the coordinate system 216 has an origin at the corner 208. In other examples, however, the origin of the coordinate system 216 can be in a different position than shown in FIG. 2.

The module layout 204 defines, in this example, the positions of various features of the module 104. The features defined by a module layout 204 can include shelf edges 116 (labelled as shelf edges 116-1, 116-2, and 116-3 in FIG. 2). Each shelf edge definition can include coordinates for one or more corners of the shelf edge, and/or dimensions of the shelf edge. The shelf edge definition can also include an indication of the orientation of the forward-facing surface of the shelf edge, such as a normal vector.

The features can also include label definitions 220, five examples of which are shown in FIG. 2. Each label definition 220 can include coordinates and/or dimensions for the label. The label definitions can also include normal vectors or other indications of orientation, as noted above in connection with the shelf edges 116. In addition, the label definitions 220 can include item identifiers such as universal product codes (UPC) or the like. The label definitions 220 can also include other item attributes, such as a price for the corresponding item 120 (which can be detected by the device 140 via optical character recognition (OCR)).

The features defined in the module layout 204 can also include item regions 224, indicating the coordinates and/or dimensions of a region of the corresponding module 104 where a specific item is expected to be placed. The item regions 224 can also indicate how many facings of the item are expected to be present, and can also include an indication of which label definition is associated with the region 224. In addition, the features defined in the module layout 204 can include item-specific information, such as an item name, brand, or the like, or other suitable information that appears on the items 120 and is therefore detectable from images captured by the device 140. The above information can include textual information detectable by the device 140 via OCR techniques, as well as images (e.g. logos and the like).

Further, the module definition 204 can include definitions of other features, such as the aisle marker 128 mentioned earlier. An aisle marker definition 228 shown in FIG. 2 can therefore include the location and/or dimensions of the aisle marker 128 in the coordinate system 216, as well as an orientation such as a normal vector. The definition 228 can also contain an indication of the appearance of the aisle marker 128 (e.g. the character "A" in this example, as seen in FIG. 1).

As seen in FIG. 2, the feature definitions in the module layout 204 may not directly indicate positions and orientations in the coordinate system 136. However, such positions and orientations can be readily determined for each module by determining a transform 232 between the coordinate system 136 and the module-specific coordinate system 216, for each module. The positions and orientations contained in the above-mentioned feature definitions can then be converted into positions and orientations in the coordinate system 136 using the transform 232. In the event that the facility layout 200 and the module layouts 204 are defined separately for the facility 100, prior to implementing the functionality described below the device 140 or another computing device can therefore perform the above conversions in order to prepare the repository 144. The repository 144 therefore contains a record for each of the above-mentioned features, indicating the positions and orientations of each feature in the coordinate system 136, as well as the other information noted above (e.g. prices, item identifiers, and the like). Once prepared, the repository 144 can be deployed to the device 140 (e.g. for storage in the memory 152), or to a network-accessible storage device that the device 140 can query.

Figure 3:
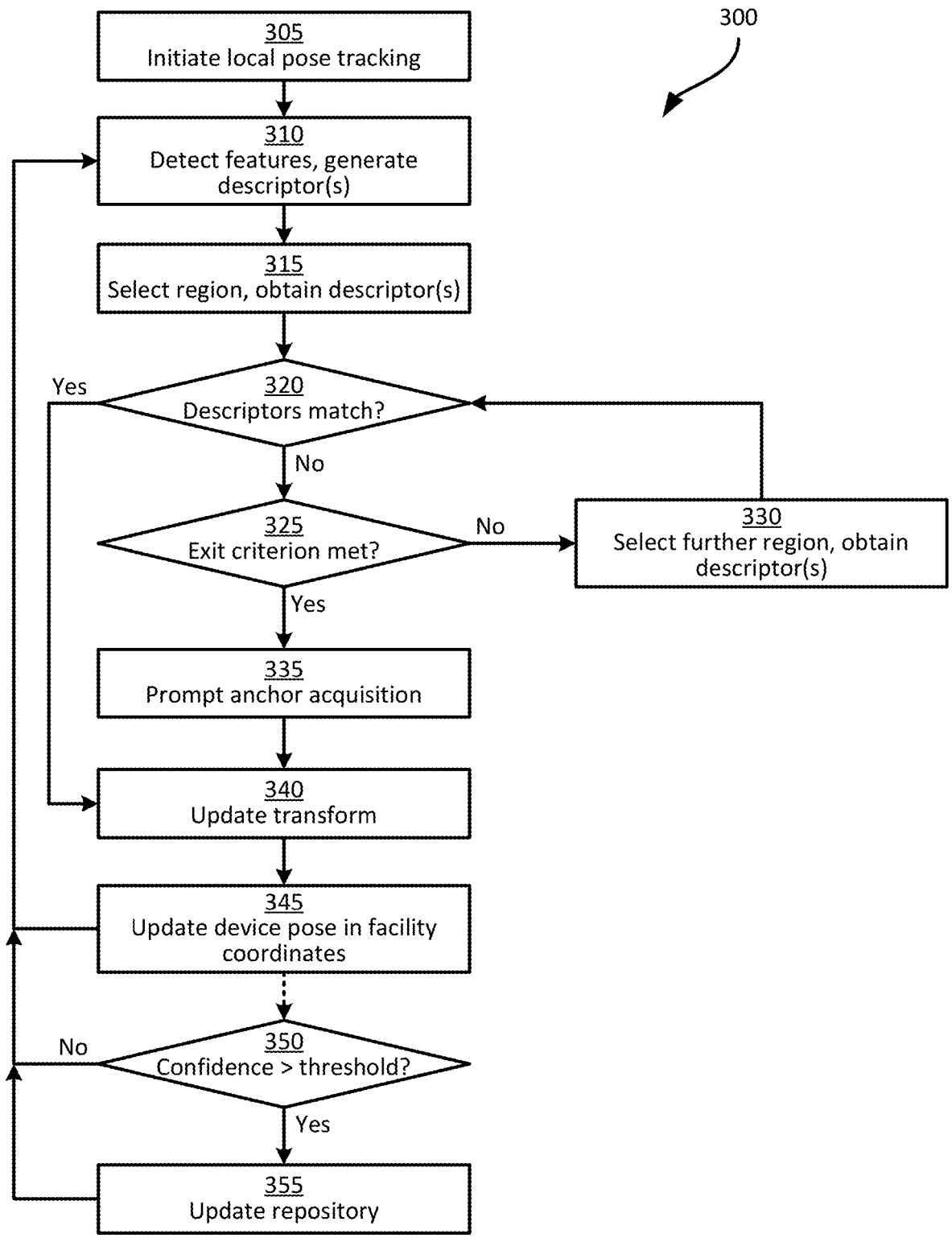
FIG. 3 is a flowchart of a method of feature-based georegistration.

Turning to FIG. 3, a method 300 of feature-based geo-registration is shown. The method 300 will be discussed below in conjunction with its performance by the device 140. As will be apparent, multiple devices 140 may be deployed in the facility 100, and each device 140 can perform a separate instance of the method 300. In other examples, a computing device such as a server deployed in the facility, e.g. the server mentioned above as storing the repository 144, can perform the method 300 on behalf of the device 140. That is, the server can perform separate instances of the method 300 for each device 140 in the facility.

At block 305, the device 140 is configured to initiate local pose tracking. Initiation of pose tracking at block 305 occurs in response to execution of the application 154, e.g. in response to an input from the operator of the device 140, a command from another computing device, or the like. In general, local pose tracking involves initiation of a local coordinate system, created by the device 140 arbitrarily (and therefore without a predetermined relationship to the facility coordinate system 136). Of note, the pose of the local coordinate system created at block 305 relative to the facility coordinate system 136 may not be known.

Local pose tracking further involves capturing a sequence of images using the camera 158 and tracking the positions of features (e.g. surfaces, edges, corners, and the like) in the sequence. The positions of such features throughout the sequence of images, combined with data from the motion sensor 164, are used to track movement of the device 140, e.g. in six degrees of freedom. More specifically, the device 140 is configured to generate a sequence of poses of the device 140 in the local coordinate system.

Various mechanisms will occur to those skilled in the art to combine image and/or motion sensor data to generate pose estimations. Examples of such mechanisms include those implemented by the ARCore software development kit provided by Google LLC, and the ARKit software development kit provided by Apple Inc. Pose tracking, once initiated at block 305, continues throughout the remainder of the method 300. The frequency with which new pose estimates are generated by the device 140 varies, for example with the computational resources available to the device 140, the frame rate of the camera 158, and the like. For example, the device 140 may generate pose estimates at a frequency of about 30 Hz, although higher and lower frequencies are also contemplated.

Figure 4:
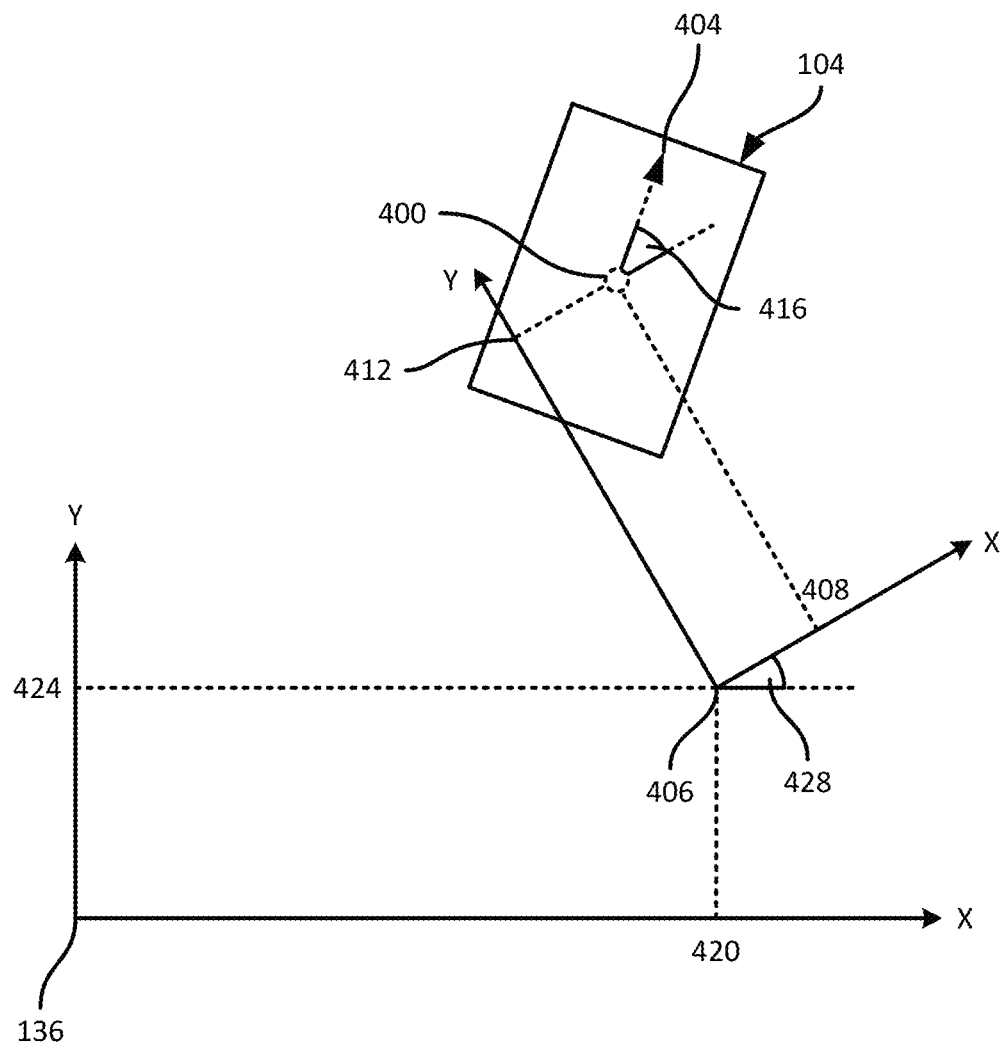
FIG. 4 is a diagram illustrating pose tracking by the mobile device of FIG. 1.

Referring to FIG. 4, the device 140 is shown in isolation, to illustrate the representation of a pose of the device 140 according to the two distinct coordinate systems noted above (the facility coordinate system 136, and the local coordinate system). The pose of the device 140 is defined by a location 400, and an orientation 404, both of which are determined by the device 140 in a local coordinate system 406, via the image feature- and motion sensor-based locationing techniques mentioned above.

The location 400 represents the location of a centroid of the device 140 in the local coordinate system 406. In other examples, the location 400 can correspond to a different point of the device 140. The location 400 is therefore defined by an X coordinate 408 in the local coordinate system 406, a Y coordinate 412 in the local coordinate system 406, and an angle in the XY plane, e.g. an angle 416 relative to the X axis of the local coordinate system 406. As will be apparent, the local coordinate system 406 and the facility coordinate system 136 may be three-dimensional systems, and the pose of the device 140 may therefore be defined with an additional coordinate and two additional angles. However, in this example the vertical dimension is omitted for simplicity of illustration.

To make use of the pose of the device 140 for providing directional guidance or other functions within the facility 100, the pose of the device 140 can be transformed to a pose in the facility coordinate system 136. Such a transformation includes applying a translation and/or a rotation to the pose in the local coordinate system 406. The transformation is defined by the pose of the origin of the local coordinate system 406 within the facility coordinate system 136. The origin of the local coordinate system 406 has a pose defined by X and Y coordinates 420 and 424, respectively, in the facility coordinate system 136, as well as an angle 428, e.g. relative to the X axis of the facility coordinate system 136.

As noted above, the transformation between coordinate systems 136 and 406 may initially be unknown, as the local coordinate system 406 is generated arbitrarily by the device 140. Further, even when the above transformation is discovered (i.e. once the coordinates 420 and 424, and the angle 428, are available to the device 140), sensor drift, image processing artifacts, interruptions in the execution of the application 154, or the like, may result in the coordinates 408 and 412 and the angle 416 no longer accurately defining the true position of the device 140 once transformed via the coordinates 420 and 424, and the angle 428. Performance of the method 300 enables the device 140 to periodically adjust or update the pose of the origin of the local coordinate system 406 within the facility coordinate system 136.

Returning to FIG. 3, at block 310 the device 140 is configured to detect features of the support structures (the modules 104, in the present example), and generate one or more descriptors for such features. Feature detection and descriptor generation are performed on at least a subset of the images captured for use in local pose tracking. For example, the device 140 may perform feature detection on every tenth image frame captured in the local pose tracking process initiated at block 305. In other examples, the device 140 may perform feature detection on fewer frames, or more frames, up to and including every frame captured and processed for local pose tracking. The features detected at block 310 by the device 140 are those represented in the repository 144. That is, the device 140 is configured to detect shelf edges 116, labels, items 120, aisle markers 128, and the like. Various mechanisms of detecting such features from image data are available, and are therefore not detailed herein.

Figure 5:
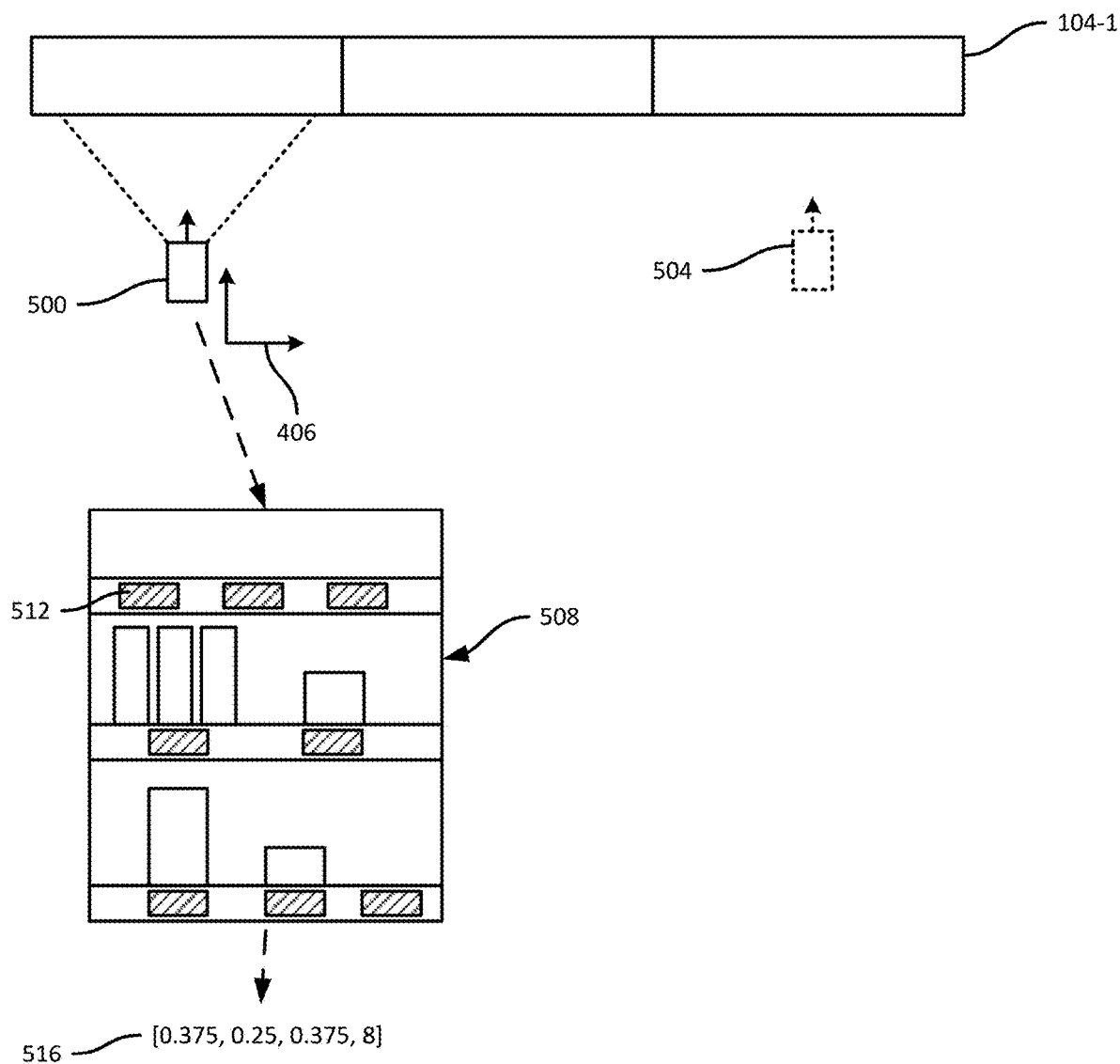
FIG. 5 is a diagram illustrating an example performance of blocks 305 and 310 of the method of FIG. 3.

FIG. 5 illustrates a portion of the facility 100, with the device 140 at an actual pose 500 therein. The pose 500, as defined in the facility coordinate system 136, may not be known to the device 140 at this point, however. For example, execution of the application 154 at the device 140 may recently have been interrupted, such that the device 140 maintains a most recently known pose 504 in the facility coordinate system 136. As seen in FIG. 5, therefore, the perception of the device 140 relating to its current pose is inaccurate, although the pose of the device 140 relative to the local coordinate system 406 is known.

FIG. 5 also illustrates an image frame 508, captured during local pose tracking as initiated at block 305. From the image frame 508, at block 310 the device 140 is configured to detect a plurality of labels 512 (highlighted with hatching) mounted on shelf edges 116. The device 140 can also be configured to detect other features, such as items 120 and shelf edges 116, however the labels 512 will be discussed herein in isolation, for simplicity of illustration. Having detected the labels 512, the device 140 is configured to generate one or more descriptors representing the pattern formed by the labels 512 in the image 508. The descriptor(s) generated at block 310 enable comparison of the features detected by the device 140 with reference features for a given module 104 retrieved from the repository. A wide variety of descriptors may be employed at block 310. In the present example, the device 140 is configured to generate a descriptor vector 516 containing, for each row of labels 512 (e.g. each subset of labels 512 appearing on the same shelf edge 116), the proportion of the total number of labels 512 in the image 508 that appear in that row. The three proportions, in this example, are then concatenated with a total count of the labels 512 (eight, in this example).

Referring again to FIG. 3, at block 315, the device 140 is configured to select a region of the facility 100 and retrieve a reference set of features corresponding to the selected region from the repository 144. In this example, the region selected at block 315 is a module 104, which is selected based on the last known pose of the device 140 in the facility coordinate system 136. Thus, in the example shown in FIG. 5, the device 140 is configured to select the module 140-1 at block 315, since the last known pose 504 of the device is closest to the module 104-1. To select a module 104 or other suitable region at block 315, the device 140 can perform a nearest neighbor search or the like, to identify the module 104 with the smallest Euclidean distance between to the pose 504.

Having selected a module 104 (e.g. the module 104-1), the device 140 is configured to generate a descriptor set corresponding to the selected module 104, or to simply retrieve the descriptor set, if the repository 144 contains precomputed descriptor sets. As will be apparent, applying the same descriptor generation process to the module layout 204 (which corresponds to the module 104-1) yields the descriptor vector [0.4, 0.4, 0.2, 5] in this example. The device 140 can generate a plurality of descriptor vectors when more than one feature type is employed at blocks 310 and 315. For example, a second descriptor vector can be generated for shelf edges 116, a further descriptor vector for detected items 120, and so on.

For example, in implementations in which the device 140 is configured to detect the labels 512 (e.g. as bounding boxes in the captured image) as well as prices presented on the labels, e.g. via OCR, the device 140 can generate additional descriptors corresponding to the price strings. Such descriptors can include a vector combining each detected price string and the coordinates of the price string in the image, or other suitable information enabling the comparison of the detected price strings to reference data from the repository 144. In further examples, descriptors can be generated that combine the label positions and the price strings. In still further examples, e.g. in which the features detected at block 310 include barcodes on the labels 512, descriptors can be generated corresponding to the locations of the barcodes in the facility coordinate system, in addition to the data encoded in the barcodes and/or the symbology of the barcodes (e.g. whether each barcode is a one-dimensional or two-dimensional barcode, and/or the specific symbology of the barcode).

At block 320, the device 140 is configured to determine whether the descriptors generated at block 310 and those obtained at block 315 match. For example, the device 140 can compute any one or more of the Euclidean distance between the detected descriptors and the reference descriptors, the cosine similarity between the detected and reference descriptors, or the like. The distance or other measure of similarity can be compared to a configurable threshold to determine whether the descriptors match. In other examples, the device 140 can implement a binary model (e.g. a support vector machine (SVM), a random forest classifier, a multi-layer perceptron (MLP), or the like). The binary model may accept the detected and reference descriptors as inputs, and generate an output indicating that the descriptors match, or do not match. As will be apparent, when the determination at block 320 is affirmative, it is likely that the module 104 in the image 508 is the same module 104 as selected at block 315. This, in turn, enables the device 140 to determine its pose within the facility 100.

In the present example, the determination at block 320 is negative, and the device 140 therefore proceeds to block 325. At block 325, the device 140 determines whether an exit criterion, or stop criterion, has been met. Given that the facility 100 may contain a large number of modules 104 (e.g. several hundred, in some facilities), it may be impractical to search the entire repository 144 for a match to the detected features. Therefore, the device 140 can determine at block 325 whether a permissible number of attempts (e.g. ten, although a wide variety of other limits may also be employed) at matching a reference set of features has been reached. When the determination at block 325 is negative, the device 140 selects a further region of the facility 100 at block 330, and obtains descriptors for the selected region from the repository before returning to block 320. The further region selected can be, for example, an adjacent region to the region selected at block 315 (or at the preceding performance of block 330).

If an affirmative determination is made at block 325, the device 140 proceeds to block 335, where a prompt can be generated (e.g. on the display 160 or other output device) to acquire an image of a unique anchor in the facility 100. For instance, the device 140 can instruct the operator (e.g. the worker 132) to place an aisle marker 128 in the field of view of the camera 158, and/or to approach a module 104 and scan a barcode (or other suitable machine readable indicium) on a label. Decoding a product identifier from a barcode, for example, may provide a unique location in the facility 100, allowing the device 140 to locate itself in the facility coordinate system 136.

In the example shown in FIG. 5, assuming that the module 104 adjacent to the module 104-1 is selected at block 330, the determination at block 320 is again negative. At a further performance of block 330, however, the module layout 204 corresponding to the module 104 depicted in the image 508 is selected. The determination at block 320 is therefore affirmative, and the device 140 proceeds to block 340.

At block 340, the device 140 is configured to update the transform between the local coordinate system 406 and the facility coordinate system 136. In particular, once the locations of the module 104 and the features thereon (such as the labels 512) are obtained from the repository 144, the device 140 is in possession of both the local poses of such features (from the pose tracking process initiated at block 305) and the poses of such features in the facility coordinate system 136. The device 140 can therefore determine, by comparing the local and facility-based poses of the features, the parameters 420, 424, and 428 that define the transform between coordinate systems 136 and 406.

Having determined an updated transform at block 340, the device 140 is configured to determine an updated pose of the device 140 itself in the facility coordinate system 136 at block 345. In particular, the device 140 is configured to apply the transform to the local pose of the device 140. Following updating of the device pose in the facility coordinate system 136, the device 140 returns to block 310 to repeat the above process. As will now be apparent, the next module 104 selected as a reference at block 315 is selected based on the newly updated device pose from block 345.

In addition to periodically updating the device pose in the facility coordinate system 136, the device 140 can also update the repository 144 itself in some examples. For instance, at block 350 the device 140 can determine whether a confidence level associated with the current local pose of the device 140 exceeds a configurable threshold. Other conditions may also be evaluated at block 350. For example, the determination at block 350 may be affirmative when local pose confidence exceeds the above-mentioned threshold, and the transform has been updated at block 340 within a certain time period (e.g. within the past five seconds). When such conditions are present, the device 140 can proceed to block 355, at which the device 140 is configured to update the contents of the repository for a location in the facility corresponding to the portion of the facility in the field of view of the camera 158. For example, the device 140 can determine the pose of a detected label 512 in the facility coordinate system 136 (using the transform from block 340). The device 140 can then transmit an update to the repository to insert the label 512 into the repository at the pose detected above. In some examples, the device 140 can be configured to query the repository 144 prior to submitting such an update, to determine whether a label is already present in the repository 144 at that pose, or within a threshold distance of that pose. When there is a mismatch between the repository 144 and the data observed by the device 140, the device 140 can generate an update request to the repository 144, to insert a label or other feature at the pose mentioned above. In this manner, the device 140 can act to update the repository when located with sufficient confidence, enabling changes to the layout of the facility 100 to be reflected in the repository 144 without the need to manually edit the repository 144.

In further examples, e.g. in which the repository 144 is stored at a central location such as a server as mentioned above, rather than updating the repository 144 at block 355, the device 140 can transmit an update indicator to the server for storage in connection with the repository 144. The update indicator can indicate that a discrepancy has been identified between the features defined at a given location in the repository 144, and the features observed by the device 140 at that location in the facility coordinate system 136. In other examples, the update indicator need not indicate a discrepancy, but rather can simply indicate the observed features in the facility for a given location in the repository (regardless of the current content of the repository 144 for that location). The update indicator therefore defines a proposed update to the repository 144 in the form of one or more features and the locations of those features in the coordinate frame of reference 136. Application of such an update to the repository 144 may be delayed until a predetermined threshold number of update indicators for the same location in the repository 144 have been stored (e.g., 5 or more indicators for the same location). For example, the device 140 or the above-mentioned server can determine how many update indicators have been received for the same location in the repository (each update indicator having been generated by a device 140 with sufficiently high predetermined local pose confidence, e.g. at or above 90% confidence). The device 140 or server can then apply the update at block 355 when the number of update indicators exceeds the threshold.

The update indicator, as noted above, can include a location in the coordinate system 136, as well as data to be updated at the repository 144, such as a label position and/or label content, an item location and/or appearance, or any other suitable feature set and the location(s) at which such features were detected by the device 140. As will now be apparent, updates to the repository 144 can be crowd-sourced from one or more devices 140, each configured to provide update indicators when locationing confidence is sufficiently high, as discussed above. The repository 144 can therefore be updated to correct erroneous data therein, and/or populated when some or all of the repository contains no data for certain locations.

Figure 6:
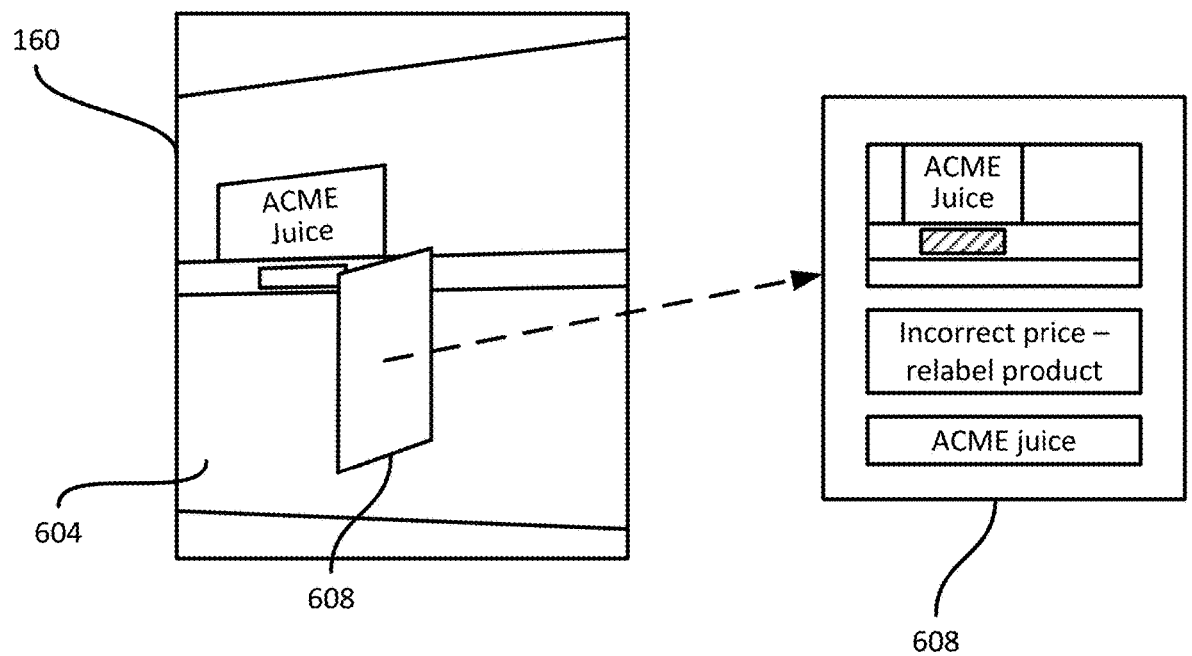
FIG. 6 is a diagram illustrating overlay data presented by the device of FIG. 1.

Turning to FIG. 6, the device 140 can also employ the pose of the device 140 in the facility coordinate system 136 to control the display 160 or other output devices. For example, FIG. 6 illustrates the display 160, presenting an image 604 captured by the camera 158 from the sequence initiated at block 305. The display 160 also presents a virtual object overlay 608, e.g. rendered as a sign extending out from the module 104 into the aisle. The virtual object contains task data, e.g. instructing the worker 132 to correct a price label for a given item 120. Rendering the virtual object overlay 608 is enabled by accurate localization of the device 140 in the facility coordinate system, via the method 300. In further examples, the display 160 can present various other types of virtual objects, such as coupons, directional guidance to items, and the like. For example, a virtual object can be presented to an operator of the device 140 (e.g. a customer, staff member, or the like) instructing the operator to travel to one or more selected locations in the facility, to traverse a certain portion of the facility such as one or more of the aisles, while the device 140 performs the method 300. Thus, the task can result in the collection of data to populate, confirm and/or correct the contents of the repository 144 via the crowd-sourcing mechanism of processing update requests mentioned above. Such tasks may be deployed to a plurality of devices 140, and may also present incentives to operators of such devices to be fulfilled upon completion of the task (e.g. coupons to be presented at specified locations in the facility).

Variations to the above are contemplated. For example, the selection of reference modules 104 at blocks 315 and 330 can be performed based not only on the most recent known pose of the device 140 in the facility coordinate system 136. In some examples, another locationing technology, such as wireless beacons deployed in the facility 100, may be used to generate an estimate of the device location in the facility coordinate system 136. Although such an estimate may be insufficiently accurate for overlay rendering as shown in FIG. 6, the selection of a reference module 104 can be based on the estimate.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a computing device, the method comprising:
   in a facility containing a plurality of support structures, capturing an image of a first support structure;
   detecting, in the image, a first feature set of the first support structure;
   selecting at least one reference feature set by proximity to an estimated location of the mobile computing device in the facility coordinate system, the at least one reference feature set selected from a repository defining feature locations for each of the support structures in a facility coordinate system;
   comparing the first feature set with the at least one reference feature set; and
   in response to determining that the first feature set matches the at least one reference feature set, determining a location of the mobile computing device in the facility coordinate system based on the image and the feature locations from the repository;
   when a confidence level associated with the location of the mobile computing device in the facility coordinate system exceeds a first threshold, receiving an update indicator defining (i) at least one feature detected in the image and (ii) a location of the at least one feature determined from the location of the mobile computing device;
   crowd-sourcing updates to the repository by:
   determining whether a number of update indicators received from at least the mobile computing device for the location of the at least one feature exceeds a second threshold; and
   when the number exceeds the second threshold, updating the repository according to the update indicator.

2. The method of claim 1, further comprising:
   in response to determining the location of the mobile computing device in the facility coordinate system, generating a transform between the facility coordinate system and a local coordinate system of the mobile computing device;
   capturing a sequence of further images; updating a local pose of the mobile computing device based on the sequence of further images; and
   updating the location of the mobile computing device in the facility coordinate system using the local pose and the transform.

3. The method of claim 2, further comprising:
   generating a confidence level associated with the local pose; and
   when the confidence level exceeds a threshold, updating the repository with at least one feature detected in the sequence of further images and a feature location corresponding to the local pose.

4. The method of claim 1, wherein the set of features include one or more of: (i) shelf edges, (ii) price labels, (iii) barcode locations, (iv) barcode symbologies, and (v) items disposed on the support structure.

5. The method of claim 1, wherein comparing the first feature set with the at least one reference feature set includes generating a descriptor for each of the first feature set and the reference set, and comparing the descriptors.

6. The method of claim 5, wherein comparing the descriptors includes determining a similarity measure.

7. The method of claim 4, wherein comparing the descriptors includes executing a binary model.

8. The method of claim 1, further comprising:
   in response to determining that the first feature set does not match the reference feature set, obtaining a further reference feature set from the repository; and
   repeating the comparing.

9. The method of claim 8, further comprising:
   in response to determining that the first feature set does not match the reference feature set, determining whether an exit criterion has been met;
   when the exit criterion has been met, capturing a machine-readable indicium and determining a location of the mobile computing device in the facility frame of reference based on a location of the machine readable indicium in the repository.

10. A computing device, comprising:
    a memory; and
    a processor configured to:
    in a facility containing a plurality of support structures, capture an image of a first support structure;
    detect, in the image, a first feature set of the first support structure;
    select at least one reference feature set by proximity to an estimated location of the mobile computing device in the facility coordinate system, the at least one reference feature set selected from a repository defining feature locations for each of the support structures in a facility coordinate system;
    compare the first feature set with the at least one reference feature set; and
    in response to determining that the first feature set matches the at least one reference feature set, determine a location of the mobile computing device in the facility coordinate system based on the image and the feature locations from the repository;
    wherein the processor is further configured to:
    when a confidence level associated with the location of the mobile computing device in the facility coordinate system exceeds a first threshold, receive an update indicator defining (i) at least one feature detected in the image and (ii) a location of the at least one feature determined from the location of the mobile computing device;

crowd-source updates to the repository by:
  determining whether a number of update indicators received from at least the mobile computing device for the location of the at least one feature exceeds a second threshold; and
  when the number exceeds the second threshold, updating the repository according to the update indicator.

11. The computing device of claim 10, wherein the processor is further configured to:
  in response to determining the location of the mobile computing device in the facility coordinate system, generate a transform between the facility coordinate system and a local coordinate system of the mobile computing device;
  capture a sequence of further images; updating a local pose of the mobile computing device based on the sequence of further images; and
  update the location of the mobile computing device in the facility coordinate system using the local pose and the transform.

12. The computing device of claim 11, wherein the processor is further configured to:
  generate a confidence level associated with the local pose; and
  when the confidence level exceeds a threshold, update the repository with at least one feature detected in the sequence of further images and a feature location corresponding to the local pose.

13. The computing device of claim 10, wherein the set of features include one or more of: (i) shelf edges, (ii) price labels, (iii) barcode locations, (iv) barcode symbologies, and (iv) items disposed on the support structure.

14. The computing device of claim 10, wherein the processor is configured, to compare the first feature set with the at least one reference feature set, to generate a descriptor for each of the first feature set and the reference set, and comparing the descriptors.

15. The computing device of claim 14, wherein the processor is configured, to compare the descriptors, to determine a similarity measure.

16. The computing device of claim 14, wherein the processor is configured, to compare the descriptors, to execute a binary model.

17. The computing device of claim 10, wherein the processor is further configured to:
  in response to determining that the first feature set does not match the reference feature set, obtain a further reference feature set from the repository; and
  repeat the comparing.

18. The computing device of claim 17, wherein the processor is further configured to:
  in response to determining that the first feature set does not match the reference feature set, determine whether an exit criterion has been met;
  when the exit criterion has been met, capture a machine-readable indicium and determine a location of the mobile computing device in the facility frame of reference based on a location of the machine readable indicium in the repository.

19. A method in a computing device, the method comprising:
  in a facility containing a plurality of support structures, capturing an image of a first support structure;
  detecting, in the image, a first feature set of the first support structure;
  selecting at least one reference feature set by proximity to an estimated location of the mobile computing device in the facility coordinate system, the at least one reference feature set selected from a repository defining feature locations for each of the support structures in a facility coordinate system;
  comparing the first feature set with the at least one reference feature set;
  in response to determining that the first feature set matches the at least one reference feature set, determining a location of the mobile computing device in the facility coordinate system based on the image and the feature locations from the repository;
  in response to determining the location of the mobile computing device in the facility coordinate system, generating a transform between the facility coordinate system and a local coordinate system of the mobile computing device;
  capturing a sequence of further images; updating a local pose of the mobile computing device based on the sequence of further images;
  updating the location of the mobile computing device in the facility coordinate system using the local pose and the transform;
  generating a confidence level associated with the local pose; and
  when the confidence level exceeds a threshold, updating the repository with at least one feature detected in the sequence of further images and a feature location corresponding to the local pose.

20. A method in a computing device, the method comprising:
  in a facility containing a plurality of support structures, capturing an image of a first support structure;
  detecting, in the image, a first feature set of the first support structure;
  selecting at least one reference feature set by proximity to an estimated location of the mobile computing device in the facility coordinate system, the at least one reference feature set selected from a repository defining feature locations for each of the support structures in a facility coordinate system;
  comparing the first feature set with the at least one reference feature set; and
  in response to determining that the first feature set matches the at least one reference feature set, determining a location of the mobile computing device in the facility coordinate system based on the image and the feature locations from the repository;
  in response to determining that the first feature set does not match the reference feature set, determining whether an exit criterion has been met;
  when the exit criterion has been met, capturing a machine-readable indicium and determining a location of the mobile computing device in the facility frame of reference based on a location of the machine readable indicium in the repository.

21. A computing device, comprising:
  a memory; and
  a processor configured to:
  in a facility containing a plurality of support structures, capture an image of a first support structure;
  detect, in the image, a first feature set of the first support structure;
  select at least one reference feature set by proximity to an estimated location of the mobile computing device in the facility coordinate system, the at least one reference feature set selected from a repository defining feature locations for each of the support structures in a facility coordinate system;

compare the first feature set with the at least one reference feature set;

in response to determining that the first feature set matches the at least one reference feature set, determine a location of the mobile computing device in the facility coordinate system based on the image and the feature locations from the repository;

generate a confidence level associated with the local pose; and when the confidence level exceeds a threshold, update the repository with at least one feature detected in the sequence of further images and a feature location corresponding to the local pose.

22. A computing device, comprising:

a memory; and a processor configured to:

in a facility containing a plurality of support structures, capture an image of a first support structure;

detect, in the image, a first feature set of the first support structure;

select at least one reference feature set by proximity to an estimated location of the mobile computing device in the facility coordinate system, the at least one reference feature set selected from a repository defining feature locations for each of the support structures in a facility coordinate system;

compare the first feature set with the at least one reference feature set; and in response to determining that the first feature set matches the at least one reference feature set, determine a location of the mobile computing device in the facility coordinate system based on the image and the feature locations from the repository; and in response to determining that the first feature set does not match the reference feature set, determine whether an exit criterion has been met;

when the exit criterion has been met, capture a machine-readable indicium and determine a location of the mobile computing device in the facility frame of reference based on a location of the machine readable indicium in the repository.

* * * * *